UNITED STATES PATENT OFFICE.

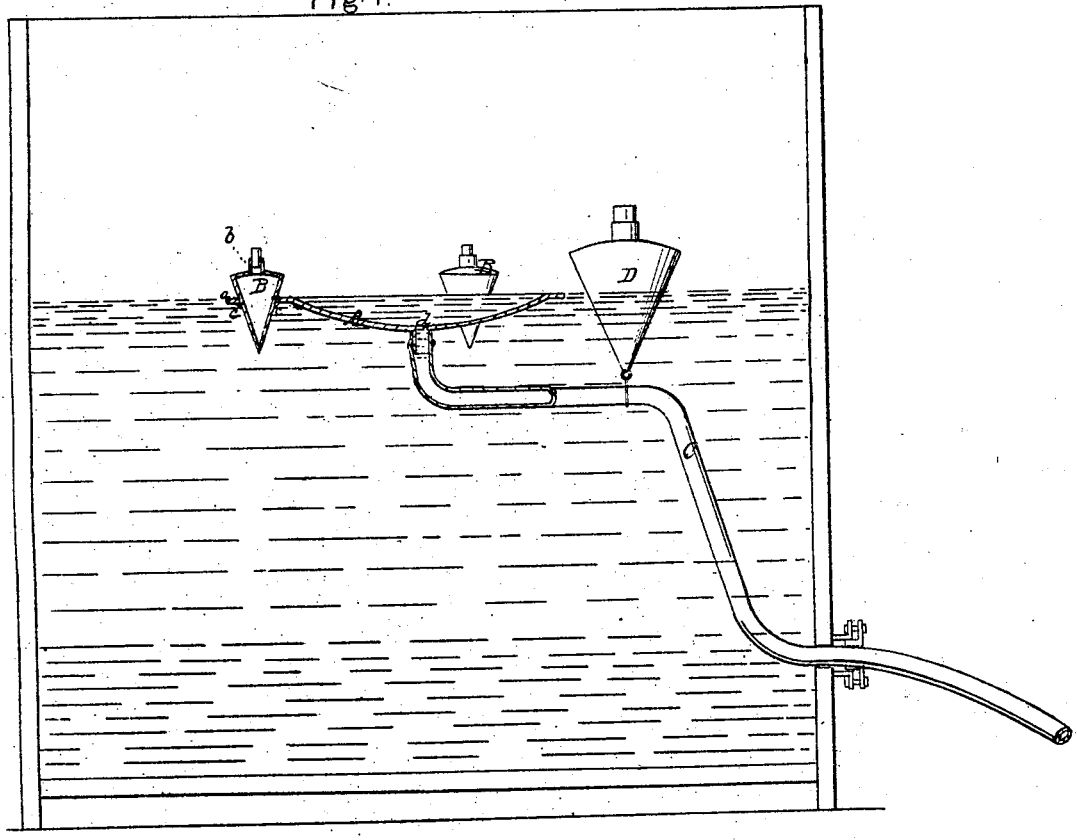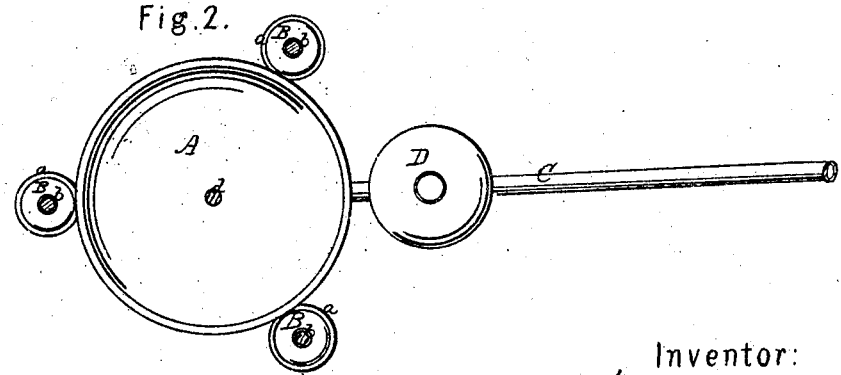

ISRAEL PECK, OF SOUTHOLD, AND W. H. H. GLOVER, OF NEW YORK, N. Y.

IMPROVED DEVICE FOR DRAWING OFF AND SKIMMING OILS, &c.

Specification forming part of Letters Patent No. 39,169, dated July 7, 1863.

*To all whom it may concern:*

Be it known that we, ISRAEL PECK, of Southold, in the county of Suffolk and State of New York, and W. H. H. GLOVER, of the city, county, and State of New York, have invented a new and Improved Skimmer for Oils and other Liquids; and we do hereby declare that the following is a full, clear, and exact description of the same, reference being had to the accompanying drawings, forming a part of this specification, in which—

Figure 1 represents a vertical central section of our invention. Fig. 2 is a plan or top view of the same.

Similar letters of reference in both views indicate corresponding parts.

In boiling fish or other materials for the purpose of extracting the oil, and in heating other substances or liquids for the purpose of evaporation, or for other purposes, the surface of the liquid is generally covered with scum, and the impurities or dregs precipitate and occupy the bottom part of the tank or still, the clear good liquid being in the middle.

The object of this invention is to drain off the clear liquid from the middle, clear from the scum on the top and from the dregs on the bottom.

The invention consists in the employment or use of a shallow saucer-shaped vessel provided with one or more floats, and with a pipe leading from its lowest point to the barrel or other vessel which is intended to receive the oil or other liquid, said pipe being sustained by one or more floats in such a manner that the saucer-shaped vessel can be adjusted to float on a level with the surface of the clear liquid under the scum and above the dregs, the vessel being balanced by the float or floats attached to it, and the pipe being sustained by the float or floats which are secured to the same, and that the clear liquid drains off through said pipe until the saucer-shaped vessel settles down on the dregs at or near the bottom of the still or tank.

To enable others skilled in the art to make and use our invention, we will proceed to describe it with reference to the drawings.

A represents a saucer-shaped vessel, made of tinned sheet-iron or any other suitable material, and provided with three (more or less) rings, a, which are intended to receive the floats B. These floats are made of sheet metal or other suitable material, in the form of cones, or in any other desirable form or shape, and they are provided with openings b, which are closed by stoppers. They are secured to the rings by small projections or lugs c on their sides, which pass down through notches in the rings, and, by turning the floats, are made to catch under the rings and retain said floats firmly in their places. The vessel A is provided with a central opening, d, and with a short tubular projection, to which a flexible pipe, C, of india-rubber or other suitable material, is firmly secured. One or more floats, D, made similar to the floats B, are intended to sustain the pipe when the skimmer is put up for use. The vessel A is placed into the tank or still containing the oil or other liquid to be skimmed, and it is balanced by means of the floats B, so that it sinks down level with the surface of the clear liquid and below the scum. In order to obtain the correct position of the vessel A, the floats B may be partially filled with shot or other heavy material. The pipe C passes off through a suitable stuffing-box in the side of the still, and in order to prevent the pipe from dragging down the vessel A its weight is balanced by the float or floats D, which may also be partially filled with shot or other suitable material. By these means the opening d in the bottom of the vessel A is constantly kept below the surface of the clear liquid, and the scum which floats on the surface of the liquid is not permitted to pass down through said opening. The clear liquid drains off, and as the quantity of the liquid in the tank diminishes the vessel A settles down until it reaches the dregs at or near the bottom. These dregs, being of greater density or specific gravity than the clear liquid, sustain the vessel A and prevent it sinking down to such a level that some of the impurities should find their way to the pipe C. The clear liquid is thus drained off, and the impurities are retained in the tank or still.

Our skimmer is particularly applicable to draining off the oil obtained by boiling fish or other similar material, but it can also be used with advantage for other liquids which, on being heated, raise a scum.

It remains to remark that the depth to which the vessel A sinks can be regulated by means of one or more sliding weights arranged on a rod or rods in such a manner that by shifting said weight or weights either the float D is depressed, leaving the skimmer free to rise, or vice versa.

What we claim as new, and desire to secure by Letters Patent, is—

The combination of the floats B B B D with the saucer A and pipe C, substantially in the manner and for the purpose herein shown and described.

ISRAEL PECK.
W. H. H. GLOVER.

Witnesses:
M. S. PARTRIDGE.
G. W. REED.